US008073861B2

(12) United States Patent
Cundiff et al.

(10) Patent No.: US 8,073,861 B2
(45) Date of Patent: Dec. 6, 2011

(54) IDENTIFYING OPPORTUNITIES FOR EFFECTIVE EXPANSION OF THE CONTENT OF A COLLABORATION APPLICATION

(75) Inventors: Daniel Mark Cundiff, Minneapolis, MN (US); Ari Edwin Olson, Rosemount, MN (US); Edwin Sidney Roger, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 422 days.

(21) Appl. No.: 11/940,756

(22) Filed: Nov. 15, 2007

(65) Prior Publication Data

US 2009/0132601 A1 May 21, 2009

(51) Int. Cl.
*G06F 7/00* (2006.01)
*G06F 17/30* (2006.01)
*G06F 13/14* (2006.01)

(52) U.S. Cl. ......... 707/768; 707/758; 707/759; 707/765

(58) Field of Classification Search .................. 707/1–6, 707/200, 10, 999.002–999.005, 999.009, 707/999.101, 999.107, 758, 759, 765, 768
See application file for complete search history.

(56) References Cited

U.S. PATENT DOCUMENTS

| | | | |
|---|---|---|---|
| 6,484,128 B1 * | 11/2002 | Sekiya et al. | 702/185 |
| 6,772,150 B1 | 8/2004 | Whitman et al. | 707/6 |
| 6,941,294 B2 | 9/2005 | Flank | 707/3 |
| 7,519,592 B2 * | 4/2009 | Hughes et al. | 707/6 |
| 7,617,202 B2 * | 11/2009 | Brill et al. | 1/1 |
| 7,617,209 B2 * | 11/2009 | Whitman et al. | 707/6 |
| 2004/0254920 A1 | 12/2004 | Brill et al. | 707/3 |
| 2006/0224579 A1 | 10/2006 | Zheng | 707/5 |
| 2007/0016545 A1 * | 1/2007 | Broder et al. | 707/1 |
| 2007/0043706 A1 | 2/2007 | Burke et al. | 707/3 |
| 2008/0010338 A1 * | 1/2008 | Curtis et al. | 709/203 |

\* cited by examiner

*Primary Examiner* — Cam-Y Truong
*Assistant Examiner* — Cecile Vo
(74) *Attorney, Agent, or Firm* — Nixon & Vanderhye P.C.

(57) ABSTRACT

Within a document collaboration system, such as a wiki application, a logging component operates in association with a server. The logging component automatically creates and maintains a log of interactions between the server and users of the document collaboration system. The content of the log has a predictable format. In one embodiment, an analysis component identifies, from the log, entries associated with a failed search for a document in the collaboration system database. The terms not represented in the database are identified from the failed search entry. In this manner, statistics related to frequently unsuccessful search terms are generated and utilized as a basis for identifying opportunities for effective expansion of the content of the collaboration application.

11 Claims, 5 Drawing Sheets

FAILED SEARCH TERM REPORT

SEARCH PERIOD 8/8/2007 - 9/9/2007

| FAILED SEARCH TERM | FAILED SEARCH TERM (NUMBER OF UNSUCCESSFUL SEARCHES) |
| --- | --- |
| TPS REPORT | 12 |
| CALENDAR YEAR | 2 |
| . . . | . . . |

FIG. 5

IDENTIFYING OPPORTUNITIES FOR EFFECTIVE EXPANSION OF THE CONTENT OF A COLLABORATION APPLICATION

BACKGROUND

A collaboration application is an application that enables its users to manipulate (add to, edit, etc.) a body of substantive content most commonly organized into a collection of informative collaboration documents that are made remotely accessible to the community of users, usually through a search interface.

One example of a collaboration application is a wiki application. A wiki application typically includes a dynamic collection of substantive information organized in the format of a collection of article-type web pages hosted on a site maintained on a computer network. In most cases, a user of the wiki application is able to selectively retrieve an article through a query process that involves a user-submission of one or more search terms that are compared to key words associated with the articles. A typical article will contain hypertext links that can be navigated to other related sources of information including, but not necessarily limited to, other articles within the content of the wiki application.

In general, users are allowed to make edits and additions to the content of the wiki application. Most if not all pages include a link to edit functionality. If a user desires to change the page, he or she simply navigates the link (e.g., thereby causing the wiki application to display a corresponding editing screen). When the user is finished editing, they issue a submit command (e.g., by pressing a submit button) thereby publishing the changes to the content of the wiki application. In general, users are allowed to edit the work of other authors (in contrast to a web log, where changes to material as originally posted are generally not allowed).

Users of a wiki application are also typically allowed to add new pages to the body of content. A new page can be linked by the page creator or by other users to existing pages. The creator and/or other users can edit the content of a new page. Thus, the content of a wiki application grows and adapts as the result of the collective editing and authorship efforts of the wiki application's community of users.

Some collaboration applications are publicly oriented. One example of this is the Wikipedia system, which is an Internet-based encyclopedia project operated by the Wikimedia Foundation, a non-profit organization (see www.wikipedia.com). Other collaboration applications are not open to the general public. For example, some companies operate a wiki application, for example, to create an internal knowledge base.

The discussion above is merely provided for general background information and is not intended for use as an aid in determining the scope of the claimed subject matter.

SUMMARY

Within a document collaboration system, such as a wiki application, a logging component operates in association with a server. The logging component automatically creates and maintains a log of interactions between the server and users of the document collaboration system. The content of the log has a predictable format. In one embodiment, an analysis component identifies, from the log, entries associated with a failed search for a document in the collaboration system database. The terms not represented in the database are identified from the failed search entry. In this manner, statistics related to frequently unsuccessful search terms are generated and utilized as a basis for identifying opportunities for effective expansion of the content of the collaboration application.

This Summary is provided to introduce a selection of concepts in a simplified form, which are further described below in the Detailed Description. This Summary is not intended to identify key features or essential features of the claimed subject matter, nor is it intended for use as an aid in determining the scope of the claimed subject matter. The claimed subject matter is not limited to implementations that solve any or all disadvantages noted in the background.

BRIEF DESCRIPTION OF THE DRAWINGS

FIG. 5 is a depiction of a computer monitor displaying a list of failed search terms.

DETAILED DESCRIPTION

To produce a collaboration application, such as a wiki, that is perceived by its users as being a particularly effective tool for retrieving information, it is desirable to minimize the number of instances where a user initiates a search for an item that is not represented in the body of content produced by the collaboration application. Further, at least in order to give the greatest number of users a sense of satisfaction as soon as possible, it is advantageous to bias the creation of new collaboration documents toward search terms that are the most frequently associated with unsuccessful searches. To achieve these goals, terms that users have not been able to find in a set of collaboration documents must be identified.

To help identify terms that users have not been able to find in a set of collaboration documents, such as documents on a wiki, embodiments described below parse a web server log to identify failed search requests made to a collaboration application. The web server log is not maintained by the collaboration application but instead is formed by a web server used to communicate with the collaboration application. The failed search requests are found by parsing the entries of the web log to locate certain error codes or text that indicate a failed search. Using the found entries, the search terms that were in the failed request are retrieved. Under some embodiments, the identified failed search terms are organized according to the frequency with which they were submitted and are provided to a user or stored for later use.

Figure 1:
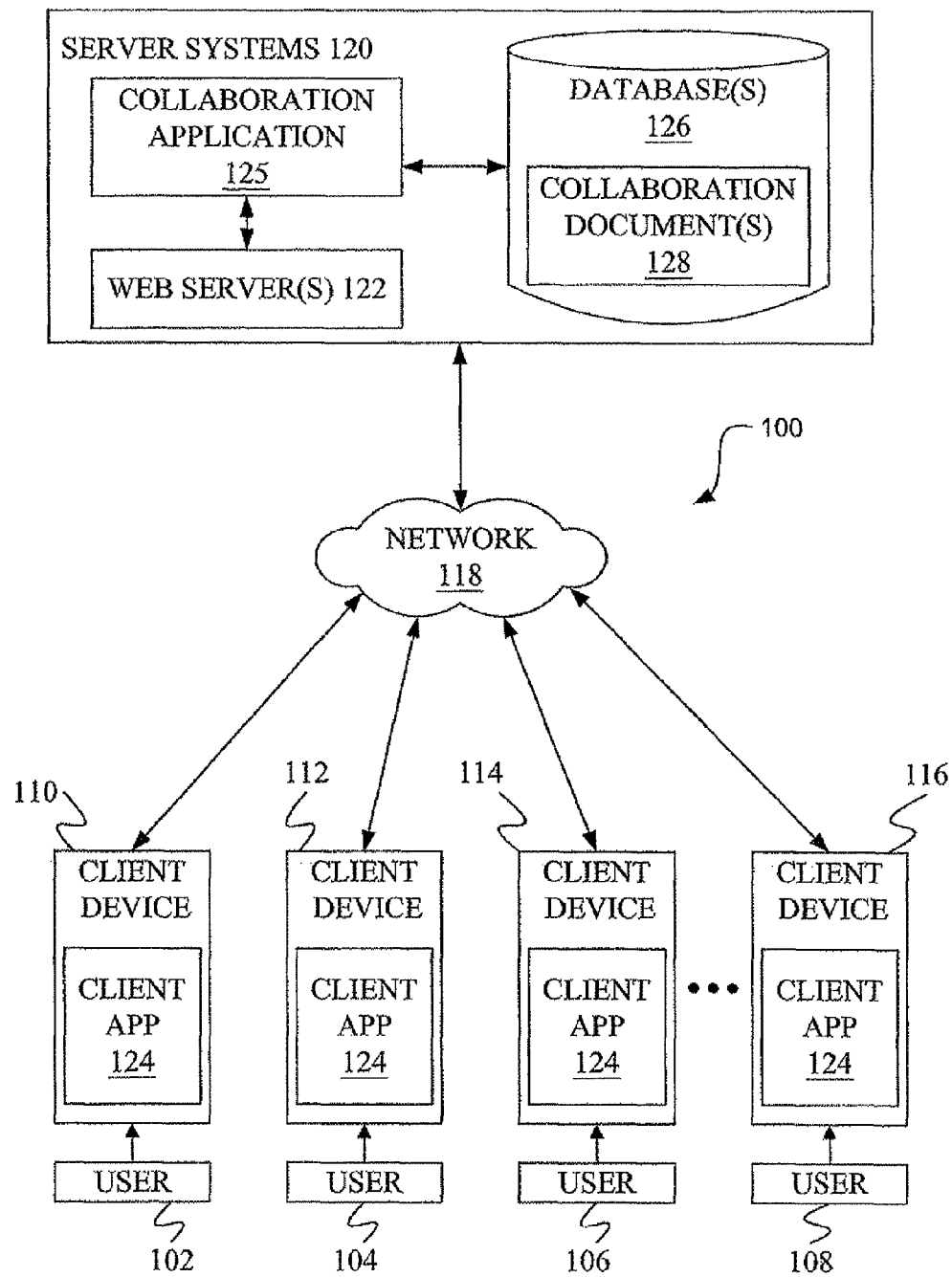
FIG. 1 is a schematic diagram of a collaboration application environment.

FIG. 1 is a schematic diagram of a collaboration application environment 100. Environment 100 is but one example of an environment in which the invention embodiments disclosed herein may be implemented. Environment 100 is not intended to suggest any limitation as to scope of use or functionality. Neither should environment 100 be interpreted as having any dependency or requirement relating to any one or combination of illustrated components.

Within environment 100, a plurality of users 102, 104, 106 and 108 are shown as interacting with a plurality of corresponding client computing devices 110, 112, 114 and 116. An illustrative four users and client devices are shown in environment 100 but an actual implementation is just as likely to include more or fewer. Each user interacts across a network 118 with server system(s) 120. Network 118 can be public in nature (e.g., the Internet, etc.) or more internally focused (e.g., a corporate LAN, a private WAN, etc.).

The individual components of server system(s) 120 (i.e., web server 122, collaboration application 125 and database 126) can all be deployed from a common computing device. For example, collaboration application 125 and database 126 can be deployed from a single computing device configured to operate as a web server (i.e., a web server 122). Alternatively, components 122, 125 and 126 can be distributed in any combination across a plurality of computing devices. Still further, server system 120 could incorporate multiple web servers or multiple databases without departing from the scope of the present invention. The illustrated scenario is but an example configuration.

In one embodiment, web server 122 is a computing device tasked with serving web pages (e.g., HTML documents) via the HTTP protocol to client devices 110, 112, 114 and 116. The web pages comprise data that is stored in database 126. In one embodiment, a relational database management system is utilized to support the storage and access of the data. In another embodiment, however, a server file system associated with web server 122 and/or application 125 is also or alternatively used to support data management.

Each of devices 110, 112, 114 and 116 includes a client application 124 (e.g., a web browser application) that supports retrieval of web pages through interaction with web server 122. It should be noted that though the reference numeral 124 has been assigned to represent the client application on all of client devices 110, 112, 114, and 116, in actuality, different client devices could operate different client device applications. The consolidation of the reference numeral is solely for the purpose of simplifying the diagram.

System 100 also includes a collaboration application 125. In one embodiment, not by limitation, collaboration application 125 is partially or fully implemented as server-side script that runs on web server 122. By interacting with application 125, users 102, 104, 106 and 108 are able to search for and selectively retrieve web pages. The retrievable web pages illustratively include collaboration documents associated with collaboration application 125. Within FIG. 1, database 126 is shown as containing the collaboration documents (i.e., collaboration documents 128, also referred to as pages 128). In actual implementation, the database may contain a limited portion of the actual documents. For example, it may contain little or no more than the substantive content of the documents. In such a case, application 125 illustratively responds to document requests by retrieving corresponding content from the database and parsing it into the actual HTML component that is sent to the client application. Those skilled in the art will appreciate that the present invention is not limited to such a particular implementation.

Application 125 supports functionality that enables each user to edit and/or add to the collection of collaboration documents. Application 125 also supports functionality that enables users to manipulate a collaboration document so as to create and/or navigate links to other collaboration documents represented in database 126. Application 125 also supports functionality that enables users to manipulate a collaboration document so as to create and/or navigate external links, such as links to information located on the Internet or an Intranet. Application 125 also supports functionality that enables users to incorporate many different types of information into collaboration documents including, but not limited to, content in the form of text, images, audio, video, etc. Broadly speaking, application 125 manages the development and navigation of the collaboration documents 128 stored in database 126. Application 125 also manages the publication of the collaboration documents 128. As such, collaboration application 125 can represent a wiki application or a knowledge management application.

Figure 2:
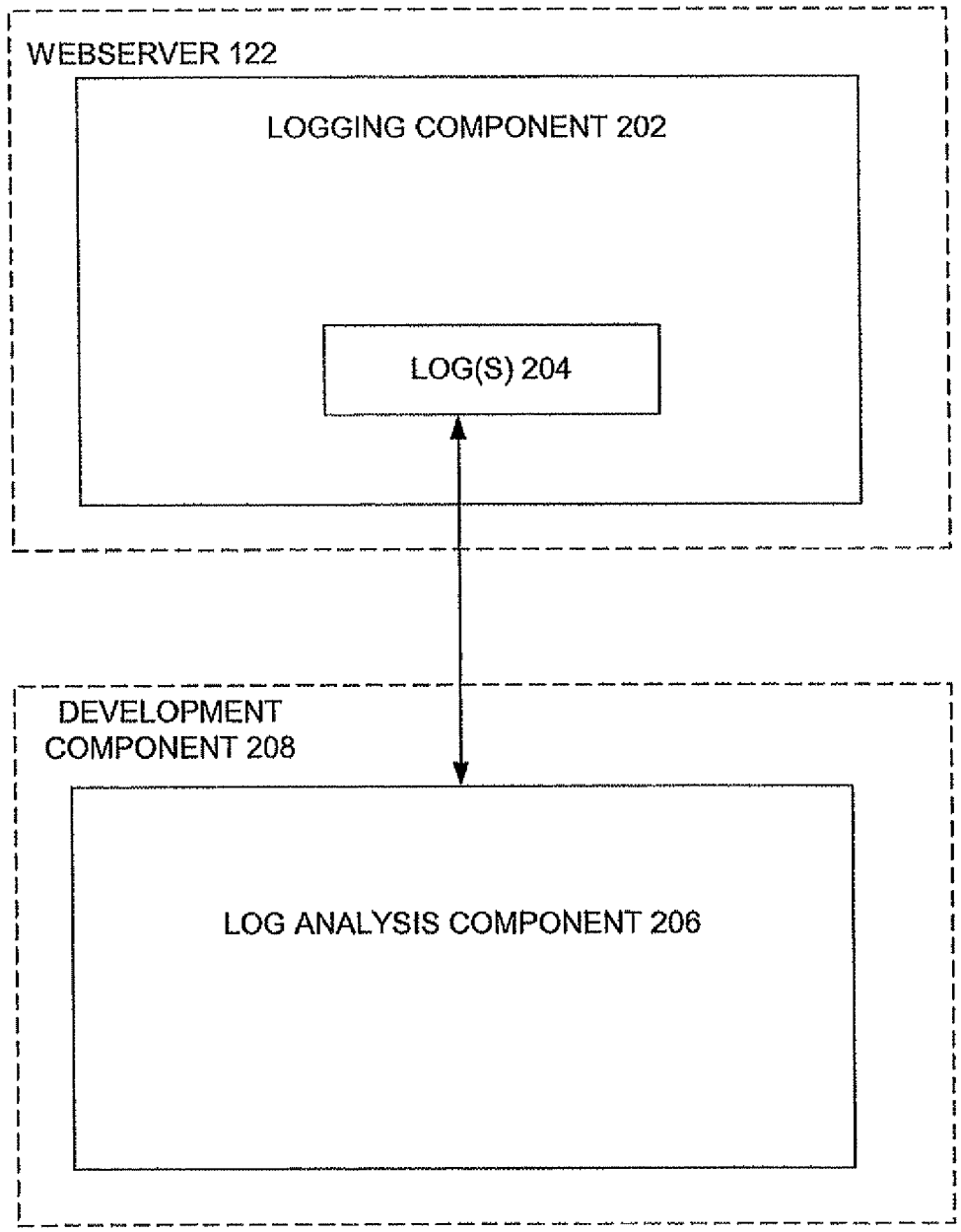
FIG. 2 is a schematic diagram of an expansion opportunity identification system.

FIG. 2 is a schematic diagram of an expansion opportunity identification system 200. As will become apparent, system 200 is illustratively deployed in the context of collaboration application environment 100. System 200 is illustratively configured to support functionality that enables an identification of opportunities to effectively expand the body of collaboration documents 128 stored in database 126.

System 200 includes a logging or interactions recording component 202 configured to generate a log 204 containing records of interactions. Logging component 202 is illustratively configured to operate in association with, but may or may not be directly installed upon, web server 122. In this case, log 204 is a file (or several files) automatically created and maintained by component 202 as a record of activity performed by web server 122. The configuration suggested in FIG. 2, with the logging component 202 and log(s) 204 implemented on web server 122, is exemplary only. Other configurations are also within the scope of the present invention.

In one embodiment, log 204 is a web server log that includes a server history of requests sent to web server 122 and the results of those requests on web server 122. The content of log 204 illustratively has, to some extent, a consistent format. The precise details of the format may vary from one particularly implementation to the next. In one embodiment, certainly not by limitation, more recent entries or records are added to the end of the file(s). In one embodiment, information about requests (e.g., client IP address, request date/time, search terms submitted, page requested, HTTP code, bytes served, user agent, referer, etc.) is tracked in the log. The data can be combined into a single file, or separated into distinct logs, such as an access log or an error log.

Log file(s) 204 are illustratively of a nature that they are not made available to general users of collaboration application 125. For example, they are unlikely to be made available to users 102, 104, 106 and 108. Instead, access is more likely to be reserved for a webmaster or other administrative personnel associated with web server 122.

Expansion opportunity identification system 200 also includes a log analysis component 206, also referred to as a record analysis component or a server history analysis component. Generally speaking, component 206 supports functionality that enables analysis of log 204. For example, in one embodiment, component 206 is configured to generate, based on the information in log 204, statistical information related to traffic patterns experienced by web server 122 by time of day, day of week, etc. Thus, component 206 is a tool that enables a webmaster or other administrative personnel to effectively manage web server 122 (FIG. 1).

Figure 3:
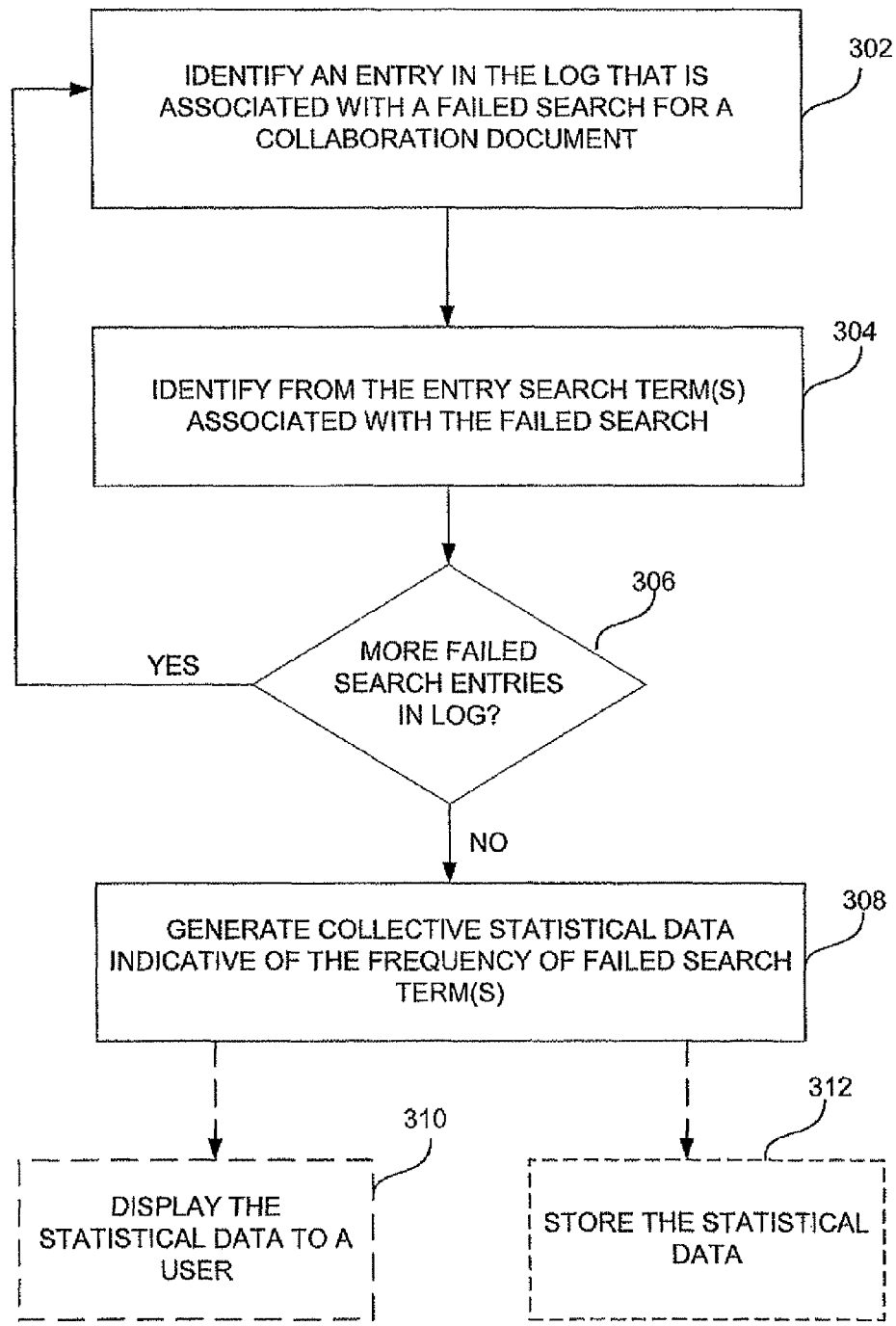
FIG. 3 is a flow chart diagram of a method for facilitating the identification of opportunities for effective expansion of the content of a collaboration application.

FIG. 3 is a flow chart diagram of a method carried out by log analysis component 206 so as to facilitate the identification of opportunities for effective expansion of the content of collaboration application 125. The method of FIG. 3 is illustratively, though not necessarily, a computer implemented method.

In accordance with block 302, an entry in log 204 is identified as being indicative of an event such as a failed user search for a collaboration document or page. In one embodiment, this step involves parsing log 204 and identifying text associated with an event, such as an entry or record, that is marked with a particular indicator in the standard log format (e.g., a particular error code, a particular text characteristic, etc.). Under one embodiment, the indicator is an error code or set of error codes that is returned by collaboration application 125 to server 122 when collaboration application 125 cannot locate collaboration documents that match search terms in a request sent to collaboration application 125 through server 122.

In accordance with block 304, one or more search terms associated with the failed search entry are identified. In one embodiment, this step involves parsing the text of the failed search entry or record and identifying a particular indicator in the standard log format (e.g., quotations, etc.) that essentially signals where in the entry the related search term or terms, concepts or words are located. The search term or terms, concepts or words are then extracted based on their relative position to the indicator. It should be noted that it is also within the scope of the present invention to identify the failed search term or terms from a log entry indicating the failed search or from a log entry associated with the initial search request. For example, it is within the scope of the present invention for a failed search to be identified based on an error code in a log entry indicating the failed search, while the corresponding failed search term or terms are identified based on an appearance of the term or terms in a separate but related entry, such as an entry corresponding to the initial submission of the term or terms. Those skilled in the art will appreciate that the present invention generally relates to using the log to identify failed searches and associated terms and that how this is precisely accomplished will depend on the format of a given log.

In accordance with block 306, a determination is made as to whether the log contains additional failed search entries. If so, the steps of blocks 302 and 304 are repeated. If not, the process proceeds to block 308. In this manner, all failed searches and the search term(s) associated with those failed searches are identified from the log.

In accordance with block 308, statistical data indicative of the frequency of particular failed search terms is generated. In one embodiment, a list of failed searched term(s) is generated with more frequently searched term(s) at the top. In other words, if the terms "ITPS Report" have been unsuccessfully searched for on twelve different occasions, and if the terms "calendar year" have been searched for on only two different occasions, then the terms "TPS Report" will appear higher on the list than "calendar year." In one embodiment, each term on the list also includes an indication of the number of times it has been unsuccessfully searched.

As is indicated by block 310, in one optional embodiment, the statistical data is displayed to a user. This may mean displaying to a webmaster or other administrative personnel, or to a general user of collaboration application 125 (e.g., one or more of users 102, 104, 106 and 108). Both of these types of users are in a position to recognize, based on the displayed statistical data, an opportunity to effectively expand the body of collaboration documents. Both of these types of users are in a position to create or arrange for creation (or to edit or arrange for editing) of a collaboration document for frequently failed search terms. For example, a new collaboration document completely dedicated to defining and describing the failed search term can be generated so that subsequent searches for the same search term will no longer fail.

In accordance with block 312, in one optional embodiment, the generated statistical data is stored on a computer-readable storage medium.

In one embodiment, log analysis component 206 is configured to generate statistical data limited to a selectable date range. For example, a user can illustratively request and receive a listing of failed searched terms entered during an input period of time. Those skilled in the art will appreciate that the failed search term information derived from log 204 can be organized and reported in many different report formats without departing from the scope of the present invention.

It is worth noting that component 206 is shown in FIG. 2 as being deployed in the generic context of a component 208. This is representative of the fact that it is not critical where in the larger system 100 the component is deployed. Component 206 may be implemented as part of collaboration application 125 or web server 122. Alternatively, however, component 206 may be implemented as part of an application having configurable functionality that supports the analysis and/or reporting of data. For example, in one embodiment, the functionality of component 206 is partially or completely supported by a an application or tool that supports the generation of advanced web, streaming, ftp or mail server statistics, graphically. An example, not by limitation, of such an application that can be utilized is an application called AWStats (http://awstats.sourceforge.net/). Component 206 may be completely or partially implemented as part of a web log analysis application.

In one embodiment, log analysis component 206 is configured to support post-process analysis, for example where a log file is parsed and a report is generated on a periodic or scheduled basis. In one embodiment, parsing and report generation are accomplished during a single pass through the log file. In another embodiment, real-time and/or on-demand reporting is supported. In one embodiment, the log file is parsed to a database in the background, and then a report is generated only when requested.

It is worth noting that there are many reasons why the described methods for identifying and tracking failed search terms are better than deriving failed search term data directly from the collaboration application. One reason is that deriving the information from the server log relieves the collaboration application from being responsible for the added processing burden. Further, as has been pointed out, the described methods enable post-process analysis and do not require constant monitoring for new failed terms. Along those lines, the described methods can be applied to any log, including logs generated when failed searched terms were not being monitored by the collaboration application (i.e., processing in hindsight is enabled). These are just a few of many advantages associated with the present invention.

It is to be understood that "term" and "search term" as utilized in the present description is intended to encompass the possibility of both one-word and multiple-word terms. Thus, "term" is not limited to being a single word. A "term" or a "search" term could just as easily be a phrase.

The methods and components discussed above may be implemented using computing devices that execute computer-executable instructions that are stored on computer-readable media. For example, web server 122 and client devices 110, 112, 114 and 116 represent computing devices that execute computer-executable instructions, for example, instructions representing collaboration application 125 and client application 124, as well as functionality associated with logging component 202 and log analysis component 206.

Figure 4:
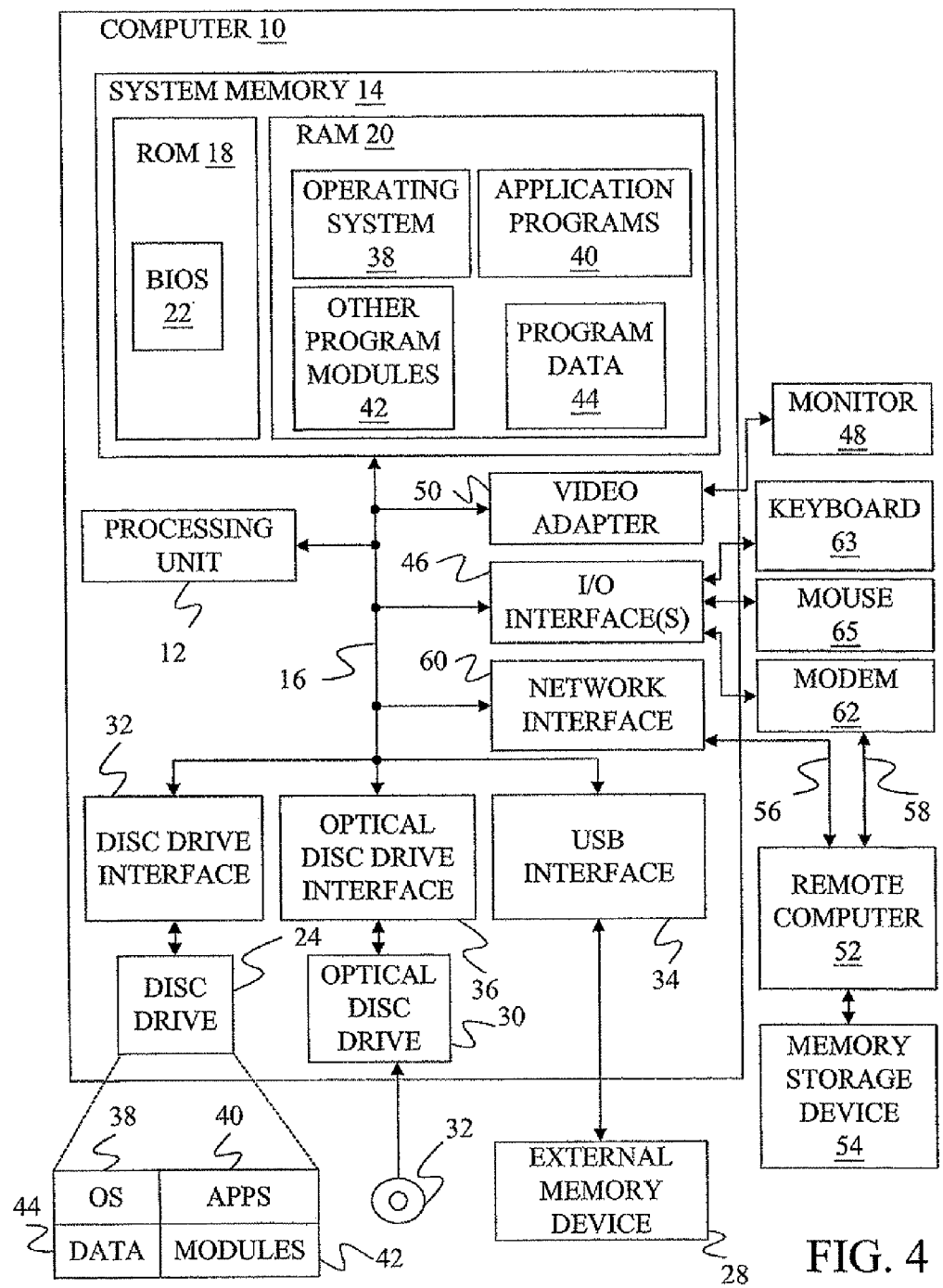
FIG. 4 is an example of a computing device.

An example of a computing device that can be used as a server or client device is shown in the block diagram of FIG. 4. The computing device 10 of FIG. 4 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the personal computer 10, is stored in ROM 18.

Embodiments of the present invention can be applied in the context of computer systems other than computer 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computer 10 further includes a hard disc drive 24, an external memory device 28, and an optical disc drive 30. External memory device 28 can include an external disc drive or solid state memory that may be attached to computer 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage for the personal computer 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include any of the applications discussed above and program data 44 may include data stored in any of the databases or lists discussed above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated.

The personal computer 10 may operate in a network environment utilizing connections to one or more remote computers, such as a remote computer 52. The remote computer 52 may be a server, a router, a peer device, or other common network node. Remote computer 52 may include many or all of the features and elements described in relation to personal computer 10, although only a memory storage device 54 has been illustrated in FIG. 4. The network connections depicted in FIG. 4 include a local area network (LAN) 56 and a wide area network (WAN) 58. Such network environments are commonplace in the art.

The personal computer 10 is connected to the LAN 56 through a network interface 60. The personal computer 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the personal computer 10, or portions thereof, may be stored in the remote memory storage device 54. For example, application programs may be stored utilizing memory storage device 54. In addition, data associated with an application program, such as data stored in the databases or lists described above, may illustratively be stored within memory storage device 54. It will be appreciated that the network connections shown in FIG. 4 are exemplary and other means for establishing a communications link between the computers, such as a wireless interface communications link, may be used.

It is to be emphasized that embodiments of the present invention are illustratively implemented in the context of a computing device, such as the computing device shown in FIG. 4. For example, in one embodiment, the step in the flow chart of FIG. 3 of displaying statistical data to a user means displaying statistical data on the monitor 48 associated with computer 10. Consistent with that premise, FIG. 5 is a graphical representation of a monitor 48 displaying a list of failed search terms.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for facilitating content expansion in a document collaboration application having a body of content within a set of collaboration documents, the method comprising:
   generating a log of interactions between a server and users of the server;
   identifying, from the log, an entry associated with a failed search by the document collaboration application for content in the set of collaboration documents, the document collaboration application being accessed through the server, the failed search being a user search request for an item that is not represented in the body of content;
   identifying, from the log, at least one term from the failed search to be designated as a failed search term, the failed search term being representative of the item that is not represented in the body of content, the identifying at least one term comprising parsing entries of the log and identifying text associated with one of the entries that is marked with an error code indicator, the failed search being a user search request for an item that is not represented in the body of content, wherein identifying at least one term further comprises, from the failed search, identifying a concept that is not represented within the collection of documents associated with a knowledge management application;
   providing an output indicating that the term is the failed search term and indicating that the concept is not represented, wherein providing an output comprises displaying a record indicating the term as a failed search term and displaying the term within a list of failed search terms, and wherein the list is ordered based on a frequency of occurrence within the log; and
   retrieving the output to identify areas of content expansion.

2. The method of claim 1, wherein identifying a term comprises identifying a term that includes multiple words.

3. The method of claim 1, wherein generating a log of interactions comprises generating a web server log.

4. The method of claim 1, wherein identifying an entry comprises parsing at least one entry in the log and identifying text associated with the entry that is marked with an error code.

5. The method of claim 1, wherein identifying a term comprises parsing the entry and identifying text associated with the entry that is marked with an error code.

6. The method of claim 1, wherein generating a log further comprises generating a log of interactions between a server and users of a wiki application accessed through the server.

7. The method of claim 1, wherein generating a log further comprises generating a log of interactions conducted over a computer network.

8. A system for facilitating content expansion in a document collaboration application having a body of content within a collection of collaboration documents, the system comprising:
   a processor;
   a web server;
   a knowledge management application that operates on the web server, the knowledge management application including the collection of collaboration documents;
   a computer network;
   a plurality of client applications configured to facilitate user interactions across the computer network with the knowledge management application;
   an interactions recording component that generates a log of interactions between a server and users of the server;
   a record analysis component that:
      identifies, from the log, an entry associated with a failed search by the document collaboration application for content in the set of collaboration documents, the document collaboration application being accessed through the server, the failed search being a user search request for an item that is not represented in the body of content;
      identifies, from the log, at least one term from the failed search to be designated as a failed search term, the failed search term being representative of the item that is not represented in the body of content, the identifying at least one term comprising parsing entries of the log and identifying text associated with one of the entries that is marked with an error code indicator, the failed search being a user search request for an item that is not represented in the body of content, wherein identifying at least one term further comprises, from the failed search, identifying a concept that is not represented within the collection of documents associated with the knowledge management application;
      provides an output indicating that the term is the failed search term and indicating that the concept is not represented, wherein providing an output comprises displaying a record indicating the term as a failed search term and displaying the term within a list of failed search terms, and wherein the list is ordered based on a frequency of occurrence within the log; and
      retrieves the output to identify areas of content expansion.

9. The system of claim 8, wherein the concept includes multiple words.

10. The system of claim 8, wherein the knowledge management application comprises a wiki application.

11. The system of claim 8, wherein the knowledge management application comprises a wiki application, and wherein the record associated with a failed search within the knowledge management application is associated with a failed search for a wiki page.

\* \* \* \* \*